(12) United States Patent
Brands et al.

(10) Patent No.: US 11,951,916 B2
(45) Date of Patent: Apr. 9, 2024

(54) REINFORCEMENT PART FOR ROUTING CABLES, AS WELL AS VEHICLE COMPONENT COMPRISING SUCH A REINFORCEMENT PART, AND VEHICLE COMPRISING SUCH A VEHICLE COMPONENT

(71) Applicant: SABIC GLOBAL TECHNOLOGIES B.V., Bergen op Zoom (NL)

(72) Inventors: Davy Wilhelmus Anna Brands, Geleen (NL); Ilona Maria Francois Grond-Soons, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 262 days.

(21) Appl. No.: 17/612,067

(22) PCT Filed: Jun. 5, 2020

(86) PCT No.: PCT/EP2020/065636
§ 371 (c)(1),
(2) Date: Nov. 17, 2021

(87) PCT Pub. No.: WO2020/245362
PCT Pub. Date: Dec. 10, 2020

(65) Prior Publication Data
US 2022/0203907 A1    Jun. 30, 2022

(30) Foreign Application Priority Data
Jun. 7, 2019 (EP) ..................................... 19178990

(51) Int. Cl.
*B60R 16/02* (2006.01)
*B60J 5/04* (2006.01)
*H02G 3/04* (2006.01)

(52) U.S. Cl.
CPC ......... *B60R 16/0215* (2013.01); *B60J 5/0444* (2013.01); *H02G 3/0406* (2013.01)

(58) Field of Classification Search
CPC ... B60R 16/0215; B60J 5/0444; H02G 3/0406
(Continued)

(56) References Cited

U.S. PATENT DOCUMENTS

| 6,908,140 B1* | 6/2005 | Carter | E05B 79/06 |
| | | | 296/146.1 |
| 2003/0008105 A1* | 1/2003 | Haack | B32B 15/14 |
| | | | 428/458 |

FOREIGN PATENT DOCUMENTS

| JP | H118922 A | 1/1999 |
| WO | 2018100146 A1 | 6/2018 |

OTHER PUBLICATIONS

International Search Report for International Application No. PCT/EP2020/065636; Application Filing Date: Jun. 5, 2020; dated Jul. 2, 2020; 3 pages.
(Continued)

*Primary Examiner* — Timothy J Thompson
*Assistant Examiner* — Michael F McAllister
(74) *Attorney, Agent, or Firm* — CANTOR COLBURN LLP

(57) ABSTRACT

The invention relates to a reinforcement part (1) for reinforcing a vehicle component, comprising a structural wall (3) enclosing walls of a ribbing structure (5), the reinforcement part having a first side region (6) allowing a first load portion to pass through and a second side region (7) allowing a second load portion to pass through, wherein the first load portion represents the largest load portion, characterized in that at the second side region, the walls of the ribbing structure are provided with cut-outs (8), the structural wall at the second side region being shaped to at least partially cover the contours (9) of the cut-outs, wherein a continu- (Continued)

ously shaped cut-out (10) is formed in the structural wall for cabling (11), whereas the walls of the ribbing structure at the first side region are free from cut-outs.

20 Claims, 5 Drawing Sheets

(58) Field of Classification Search
USPC .................................................... 174/72 A
See application file for complete search history.

(56) References Cited

OTHER PUBLICATIONS

Written Opinion for International Application No. PCT/EP2020/065636; Application Filing Date: Jun. 5, 2020; dated Jul. 2, 2020; 5 pages.

* cited by examiner

REINFORCEMENT PART FOR ROUTING CABLES, AS WELL AS VEHICLE COMPONENT COMPRISING SUCH A REINFORCEMENT PART, AND VEHICLE COMPRISING SUCH A VEHICLE COMPONENT

CROSS REFERENCE TO RELATED APPLICATIONS

This application is a National Stage application of PCT/EP2020/065636, filed Jun. 5, 2020, which claims the benefit of European Application No. 19178990.8, filed Jun. 7, 2019, both of which are incorporated by reference in their entirety herein.

TECHNICAL FIELD

The present subject matter relates to a reinforcement part, such as a composite reinforcement part or an injection-molded part, for reinforcing a vehicle component, as well as a vehicle component comprising such a reinforcement part, and a vehicle comprising such a vehicle component.

BACKGROUND

Such reinforcement parts are for instance known from WO 2018/100146 A1, which discloses a hybrid tailgate for a vehicle, comprising a thermoplastic inner structure forming the carrier frame of the tailgate, and at least one composite reinforcement part to reinforce the carrier frame, wherein the reinforcement part is connected to the thermoplastic inner structure at a first surface, wherein the reinforcement part forms a continuous load path in the inner structure enclosing a tailgate window opening for a window glazing part of the tailgate. Ribbing is applied to enhance structural rigidity and strength of the composite reinforcement part.

A problem with the reinforcement parts as described above is that cabling, such as electrical wiring or a wiring loom, for instance for lighting, radio, LIDAR (Light Detection And Ranging or Laser Imaging Detection And Ranging), radar and the like, may have to be routed through the reinforcement part. Normally, this is done by forming apertures at the top of the ribbing structure to create a continuous recess or groove for accommodating the cabling, thereby of course lowering the effectiveness of the composite ribbing in the part. Often, the most critical load bearing areas are cut into, thereby severely decreasing the load bearing capability of the ribbing structure and the reinforcement part as a whole.

SUMMARY

An object of the present subject matter is therefore to provide a reinforcement part for reinforcing a vehicle component, as described above, wherein, when routing cabling through the reinforcement part, decreases in load bearing capability of the ribbing structure and the reinforcement part are prevented or at least kept to a minimum.

Hereto, the reinforcement part according to the present subject matter comprises a structural wall extending along a longitudinal axis of the reinforcement part, wherein the structural wall at least partly encloses walls of a ribbing structure for supporting structural strength of the reinforcement part, the reinforcement part, when viewed in cross-section, having a first side region configured for allowing a first load portion to pass through and a second side region configured for allowing a second load portion to pass through, wherein the first load portion represents the largest load portion occurring at the cross-section, wherein the ribbing structure is at least provided at the first side region and the second side region, wherein at the second side region, when viewed along the longitudinal axis, the walls of the ribbing structure are provided with apertures, the structural wall at the second side region being shaped to at least partially cover, and optionally follow, the contours of the apertures, in such a way, that a continuously shaped aperture is formed in the structural wall for routing cabling, whereas the walls of the ribbing structure at the first side region are free from apertures to keep the ribbing structure at the first side region intact.

Due to the provision of apertures in the second side region (where the load portion to be transferred is smaller), instead of at the first side region (where the largest load portion is to be transmitted), load bearing performance of the ribbing structure and the reinforcement part is substantially improved. In particular bending load behavior as well as torsional load behavior drastically improve. Of course, the degree of benefit to be gained depends on the actual design (geometry, material used) of the reinforcement part.

The inventors have found, however, that, at the second side region, the structural wall itself should not be cut into or should only be partially cut into, wherein the structural wall is to be shaped to at least partially cover and optionally follow the contours of the apertures to form a continuously shaped aperture, recess or groove for routing or accommodating cabling. If the structural wall itself is cut into, e.g. if a continuous cut is made in the length direction along the longitudinal axis (the structural wall thereby becoming discontinuous, when viewed in cross-section), the load bearing performance of the ribbing structure and the reinforcement part as a whole will actually be worse than with prior art reinforcement parts, wherein apertures are made in the first side region. However, according to the present subject matter, partial apertures of the structural wall still lead to substantial improvement of the mechanical stiffness over the prior art reinforcement parts. Optionally, such partial apertures comprise (when seen in longitudinal direction) aperture portions alternating with solid portions. Optionally, the solid portions coincide with the areas where the ribbing structure contacts the structural wall at the side regions of the reinforcement part. Optionally, the surface area of the aperture portions is 40-60%, such as 50%, of the surface area of the structural wall.

It should be understood that "apertures" may also relate to other features harming the structural integrity of the ribbing structure and/or structural wall in a similar fashion, such as cuts, holes, grooves or recesses (or basically any other way of removing substantial amounts of material). Furthermore, "side region" refers to any lateral delimitation of the reinforcement part, when viewed along the longitudinal axis X. Expressions such as "top side", bottom side", "left side", "right side", et cetera, are intended to be covered by the general expression "side region".

According to an embodiment, the second load portion represents the smallest load portion occurring at the cross-section to allow for optimal bending and torsional behavior of the reinforcement part.

An embodiment furthermore relates to an abovementioned reinforcement part, wherein, when viewed in cross-section, the structural wall has an open side, the first side region comprising the open side, the walls of the ribbing structure at the open side being free from apertures. The open side allows the structural wall to become lighter and furthermore allows the designer with more design flexibility, while keeping structural rigidity of the first side region intact by not weakening the ribbing structure there. In other words, the reinforcement part has an open side, where the ribbing structure is exposed.

Optionally, the structural wall therein comprises a base or top wall and sidewalls connected to the top wall, the top wall and sidewalls enclosing the ribbing structure, wherein the second side region is located at the top wall and/or at least one of the sidewalls. Thus, a beam or the like can be created with optimal structural rigidity.

Optionally, the structural wall therein has a U-shape, comprising a top and legs connected to the top, the legs forming the sidewalls of the structural wall and the top forming the top wall of the structural wall. Such U-shaped beams can be easily connected or attached to a vehicle component to reinforce the vehicle component, for instance via flanges arranged at the free ends of the legs.

An embodiment furthermore relates to an abovementioned reinforcement part, wherein the walls of the ribbing structure at the first side region have a larger thickness than the walls of the ribbing structure at the second side region to even further amplify the contribution made by the ribbing structure to load transfer at the first side region.

An embodiment relates to an abovementioned reinforcement part, wherein the ribbing structure comprises a cross-ribbing structure, wherein the walls of the cross-ribbing structure are arranged at an angle with respect to each other, such as at an angle of larger than 0° and up to 90° (including 90° as such), optionally between 20° to 70°, or between 30 to 60°, such that optimal transfer of various types of loads, in various directions, is achieved.

Optionally, the apertures have a partly circular, oval or elliptical shape, to prevent undesirable stress concentrations around the apertures and thus to optimize load bearing capability. Furthermore, the partly circular, oval or elliptical shape prevents cabling, wiring, or the like, arranged in the continuous aperture from being damaged during use, for instance due to vehicle movement.

It has been found that a width of the apertures, when viewed along the longitudinal axis, of 10-30 mm, optionally 15-25 mm, or 20 mm and/or a height of the apertures of 10-20 mm, or 15 mm, in practice can provide a great balance between the volume of cabling that can be arranged in the (continuously shaped) aperture on the one hand and structural rigidity of the second side region on the other hand.

The structural wall optionally has a thickness of 1-6 mm, such as 2-4 mm, or 3 mm.

Another aspect of the present subject matter relates to an aforementioned reinforcement part according, comprising cabling, wiring, ducting or the like, arranged in the continuously shaped aperture.

Another aspect of the present subject matter concerns a vehicle component comprising an aforementioned reinforcement part.

The vehicle component may for instance be a tailgate, a front end module or a door module.

Yet another aspect of the present subject matter relates to a vehicle comprising an aforementioned vehicle component.

An aspect of the present subject matter provides an apparatus for reinforcing a vehicle component and supporting a wiring loom, the apparatus comprising: a structural wall defining a channel having a channel opening, the structural wall having an inner surface defining the channel and an outer surface. The apparatus, or reinforcing component, can form a part of a wire loom module or a door panel module. In an aspect, the reinforcing component can include a ribbing structure disposed in the channel and coupled to the channel such that channel is open with the ribbing structure exposed, wherein the ribbing structure is configured to increase a rigidity of the structural wall. In an aspect, a portion of the outer surface of the structural wall defines curvilinear plane interrupted by a wiring loom channel set into the outer surface, with the wiring loom channel formed from material of the structural wall extending across a plurality of ribs of the ribbing structure to form an elongate smooth surface and to define a void sized to receive the wiring loom. In an aspect of the present disclosure the ribbing structure extends from a bottom of the channel to meet, at least partially, a plane defined by the channel opening, such that openings of a lattice of the ribbing structure are exposed through the channel opening.

In an aspect the structural wall comprises a top wall, a first sidewall coupled to the top wall and extending away from the top wall, and a second sidewall coupled to the top wall, opposite the first sidewall, the second sidewall extending away from the top wall, wherein the top wall, the first sidewall and the second sidewall define the channel, wherein the channel envelopes the ribbing structure, and wherein the wiring loom channel is disposed in one of the top wall, the first sidewall and the second sidewall. In an aspect the wiring loom channel is disposed in the top wall. In an aspect the wiring loom channel is disposed in the second sidewall.

In an aspect a wire loom channel defines a plurality of apertures. At least one of the apertures is sized to receive a fastener. In an aspect the fastener is one of a group including a Christmas tree, a zip tie, a snap, and a clip. In an aspect the apertures have a partly circular, oval or elliptical shape. In an aspect the apertures, when viewed along a longitudinal axis of the vehicle component, is 10-30 mm, preferably 15-25 mm, more preferably 20 mm and/or wherein a height of the apertures, perpendicular the width, is 10-20 mm, preferably 15 mm.

In an aspect of the present subject matter the structural wall has a thickness of 1-6 mm, such as 2-4 mm, preferably 3 mm. In an aspect the structural wall is a formed of at least one of metal and plastic. In an aspect the structural wall is formed of polypropylene. In an aspect the ribbing structure is formed of at least one of metal and plastic. In an aspect the structural wall is formed of polypropylene. In an aspect the structural wall and the ribbing structure are formed of a monolithic polypropylene. In an aspect the ribbing structure can be thicker near the channel opening. In an aspect the ribbing structure comprises a cross-ribbing structure, wherein the walls of the cross-ribbing structure are arranged at an angle with respect to each other of larger than 0 degrees and up to 90 degrees, preferably between 20 degrees to 70 degrees, more preferably between 30 degrees to 60 degrees.

BRIEF DESCRIPTION OF THE DRAWINGS

The present subject matter will be explained hereafter with reference to exemplary embodiments of the reinforcement part according to the present subject matter and with reference to the drawings. Therein.

DETAILED DESCRIPTION

Figure 1:
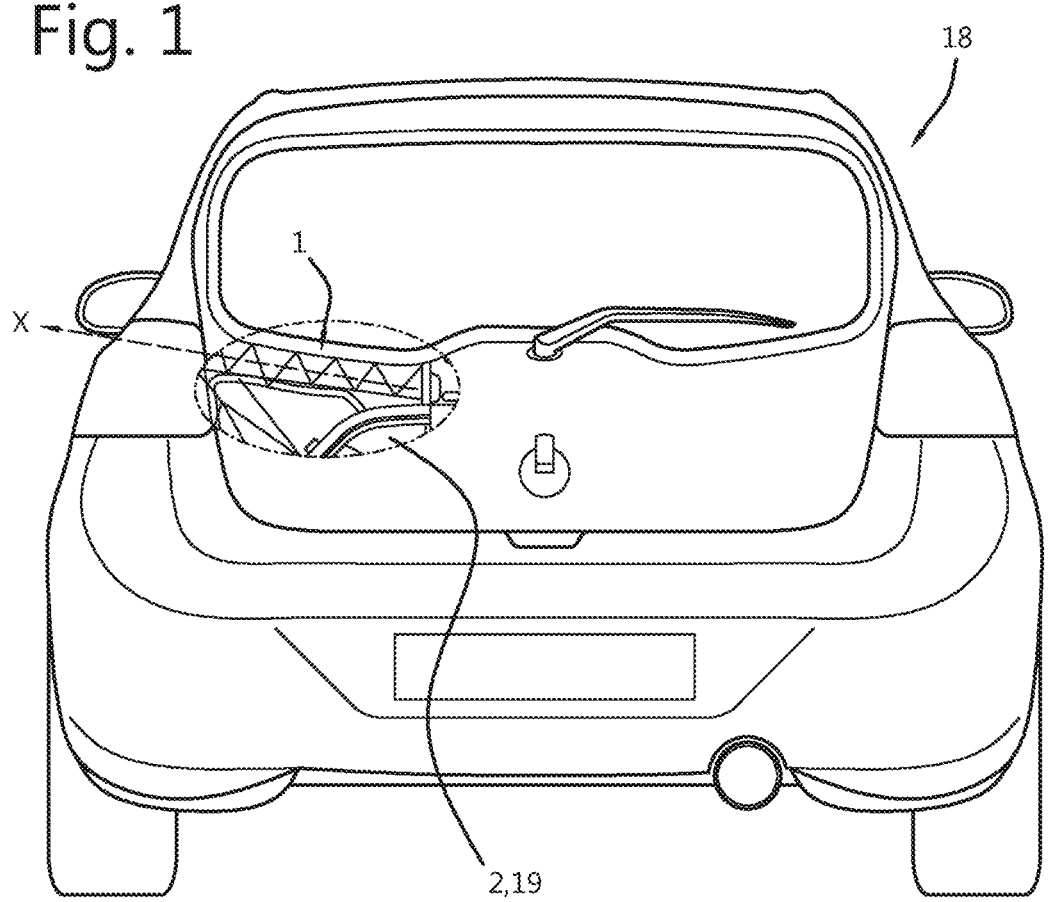
FIG. 1 shows a schematic view of a vehicle with a vehicle component comprising a reinforcement part.
Figure 2:
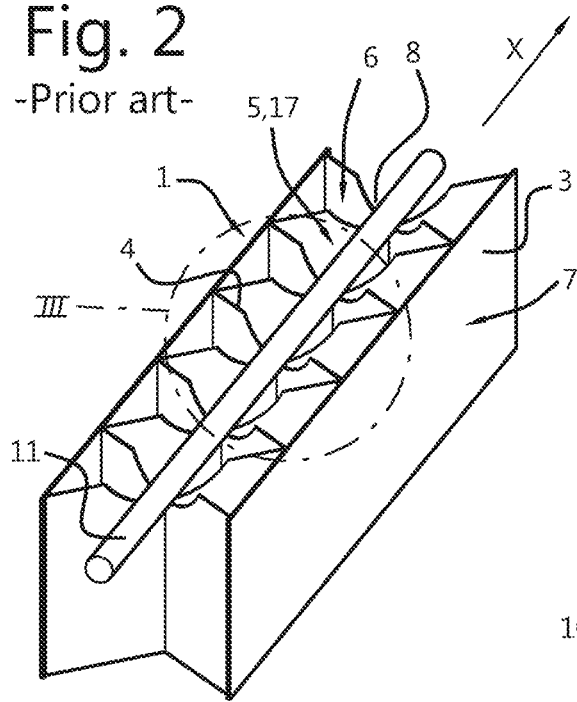
FIGS. 2-5 show a prior art reinforcement part with top apertures.
Figure 3:
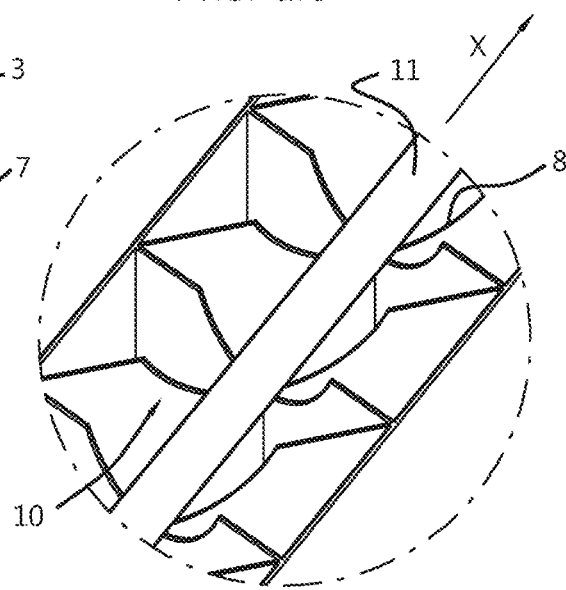
Figure 4:
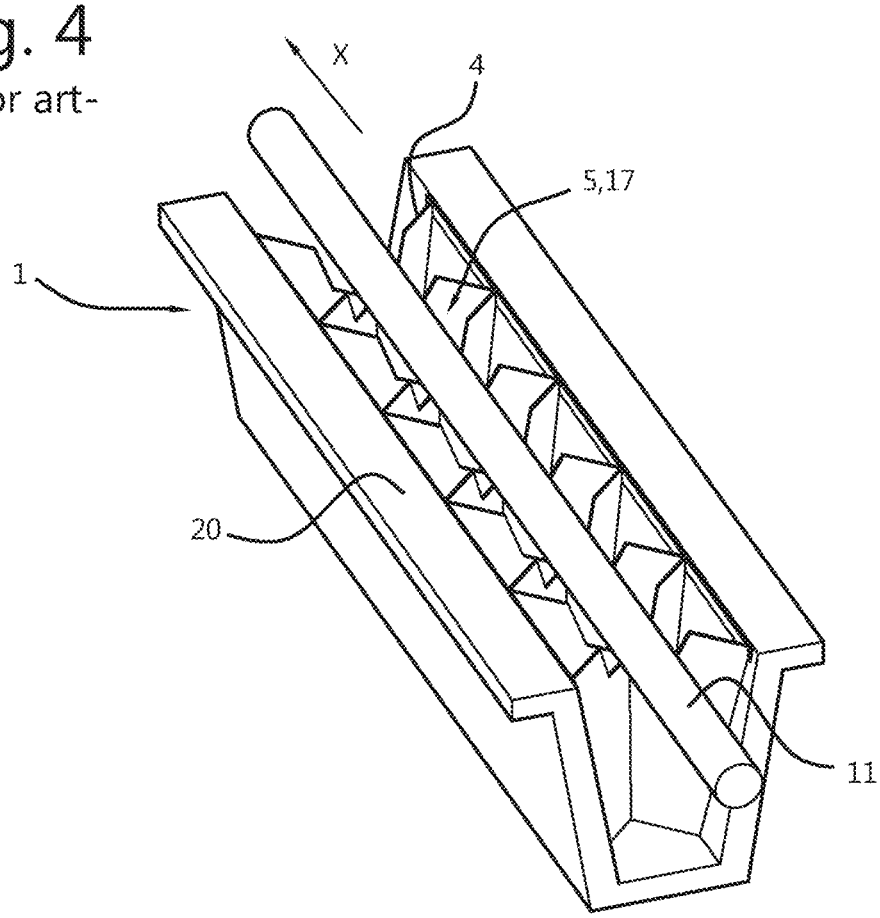
Figure 5:
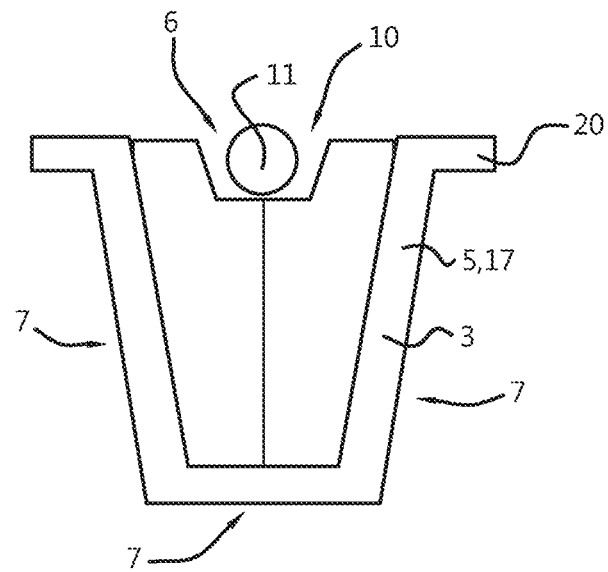
Figure 6:
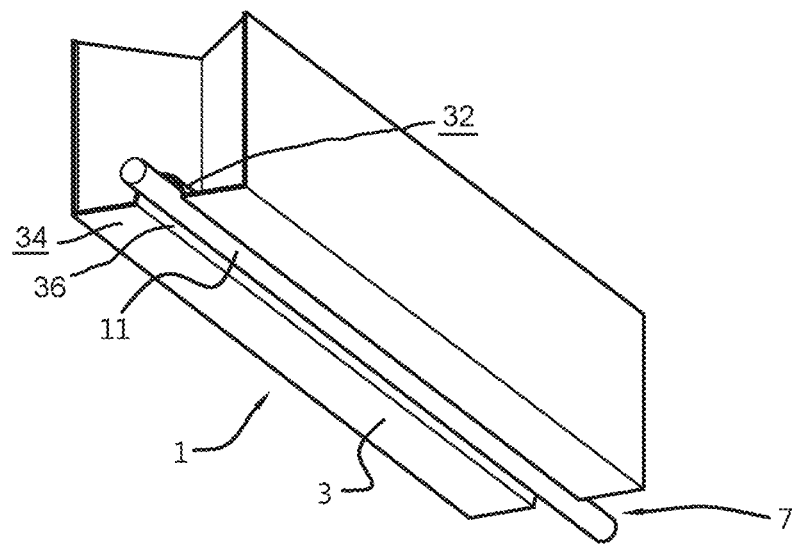
FIG. 6 shows a schematic perspective view of an exemplary embodiment of a reinforcement part according to the present subject matter, with bottom apertures.

FIGS. 1-11 will be discussed in conjunction. FIG. 1 shows a portion of a vehicle 18 provided with a vehicle component 2 comprising a reinforcement part 1, for instance according to the present subject matter (FIGS. 6-10). The vehicle component 2 could be formed by a tailgate 19 as shown in FIG. 1, but can also be formed by other vehicle components, like doors and side panels (not shown) that are made of thermoplastics with reinforcement ribs. Optimal use of such reinforcement parts 1, for instance near highly loaded areas, reduces vehicle weight significantly. The reinforcement part 1 can for instance be integrated in the vehicle component 2 by injection molding, overmolding, or adhesion by welding or gluing. The reinforcement part 1 may comprise a composite material laminate with a layer of a composite tape having a thermoplastic matrix material with continuous fibers embedded in the matrix material. The matrix material is preferred to be a thermoplastic material, such as a polyolefin.

The vehicle component may comprise a polybutylene terephthalate (PBT); acrylonitrile-butadiene-styrene (ABS); polycarbonate; polycarbonate/PET blends; polycarbonate/ABS blends; acrylic-styrene-acrylonitrile (ASA); phenylene ether resins; blends of polyphenylene ether/polyamide; blends of polycarbonate/polyethylene terephthalate (PET)/polybutylene terephthalate (PBT); polyamides; phenylene sulfide resins; polyvinyl chloride PVC; (high impact) polystyrene; polyolefins such as polypropylene (PP), expanded polypropylene (EPP) or polyethylene; polysiloxane; polyurethane and thermoplastic olefins (TPO), as well as combinations comprising at least one of the foregoing. The vehicle component may comprise a fiber filled thermoplastic material, in particular from the list above. For example, a fiber-filled polyolefin can be used. The fiber material may include glass fiber, long or short, carbon fiber, aramid fiber, or any plastic fiber. In particular, long glass fiber filled polypropylene may be used. Long fibers are defined as fibers with an initial, e.g. pre-molding, length of greater than or equal to 3 mm. International patent publication WO 2018/100146 A1 discloses further advantageous techniques and materials for fabricating the reinforcement part 1.

Generally speaking, FIGS. 2-5 show a prior art elongated, beam-like reinforcement part 1, such as a composite or injection-molded reinforcement part 1, for reinforcing a vehicle component 2, comprising a structural wall 3 extending along a longitudinal axis X of the reinforcement part 1. The reinforcement part 1 can be made of Long glass fiber reinforced PP (PP-LGF). The structural wall 3 at least partly encloses walls 4 of a ribbing structure 5 for providing structural strength of the reinforcement part 1, with the walls 4 of the ribbing structure 5 extending in a vertical direction with respect to a first side region 6, e.g. perpendicular to the top side. The structural wall 3 may comprise one or more flanges 20 for attachment purposes.

The reinforcement part 1, when viewed in cross-section, has the first side region 6 configured for (during its intended use) allowing a first load portion to pass through and a second side region 7 configured for allowing a second load portion to pass through. The first load portion represents the largest load portion occurring at the cross-section (e.g. for the intended loading conditions during use). The ribbing structure 5 is at least provided at the first side region 6 and the second side region 7. The ribbing structure 5 may comprise a cross-ribbing structure 17, wherein the walls 4 of the cross-ribbing structure 17 are arranged at an angle with respect to each other, such as at an angle of larger than 0° and up to 90°, optionally between 20° to 70°, or between 30 to 60°. However, this depends on the specific design of the ribbing structure 5.

When for instance arranging cabling 11 or wiring 11 through the vehicle component 2, for instance lighting, radio and the like, space needs to be created in the various components where the wiring 11 goes through, e.g. also in the reinforcement part 1.

As shown in FIGS. 2-5, usually this is done at a first side region 6 at the top, e.g. the visible part, of the reinforcement part 1, that is easy to access. However, making apertures 8 in the top of the walls 4 or reinforcement ribs 4 of the ribbing structure 5 to form a continuous aperture 10 for accommodating cabling or wiring 11 can decrease the effectiveness of such ribbing and reduces the torsional and bending stiffness of the reinforcement part 1.

As shown in FIGS. 6-10, according to the present subject matter, when viewed along the longitudinal axis X, the walls 4 of the ribbing structure 5 are provided with apertures 8 at the second side region 7, e.g. in a side region 7 with smaller loading than the first side region 6 (e.g. the smallest loading at the respective cross-section). The structural wall 3 at the second side region 7 is shaped to cover and optionally follow the contours 9 of the apertures 8, in such a way, that a continuous aperture 10 is formed in the structural wall 3 for routing cabling 11 (e.g. along the longitudinal axis X). The walls 4 of the ribbing structure 5 at the first side region 6 are free from such apertures 8 or similar features harming the structural integrity of the ribbing structure 5 at the first side region 6, to keep the ribbing structure 5 at the first side region 6 as intact as possible.

As shown in FIGS. 6-10, the structural wall 3 may have an open (top) side 12, the first side region 6 comprising the open side 12. The structural wall 3 can define a channel 40 having a channel opening 38. The structural wall 3 can have an inner surface 32 and an outer surface 34. A ribbing structure 5 can be disposed in the channel 40 and coupled to the structural wall such that channel is open with the ribbing structure exposed, wherein the ribbing structure is configured to increase a rigidity of the structural wall. A portion of the outer surface 34 of the structural wall 3 can define a curvilinear plane interrupted by a wiring loom channel 36 set into the outer surface, the wiring loom channel 36 formed from material of the structural wall extending across a plurality of ribs of the ribbing structure to form an elongate smooth surface and to define a void sized to receive the wiring loom 11.

The walls 4 of the ribbing structure 5 at the open side 12 are free from apertures 8 to keep the ribbing structure 5 intact there. The structural wall 3 may have a U-shape (enclosing the ribbing structure 5), comprising a top 15 and legs 16 connected to the top 15, the legs 16 forming sidewalls 14 of the structural wall 3 and the top 15 forming a top wall 13 of the structural wall 3.

The walls 4 of the ribbing structure 5 at the first side region 6 optionally have a larger thickness than the walls 4 of the ribbing structure 5 at the second side region 7.

Figure 7:
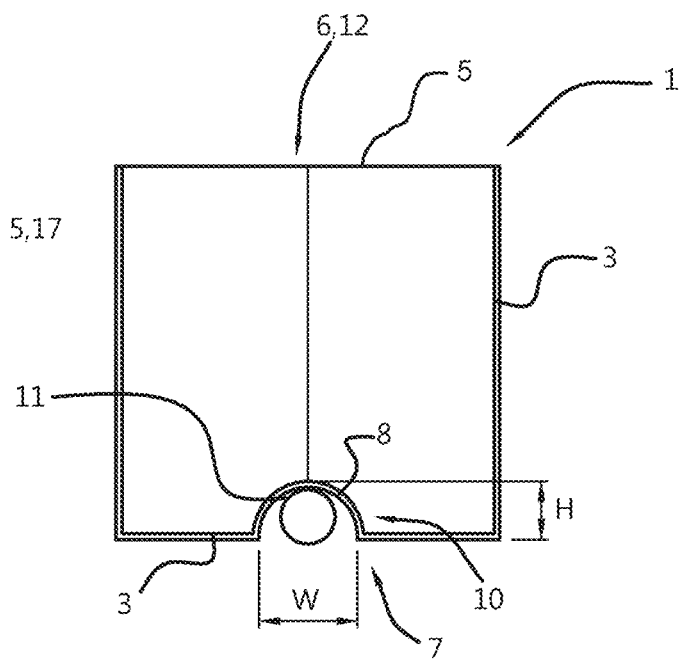
FIG. 7 shows a cross-sectional view of the reinforcement part according to FIG. 6.
Figure 8:
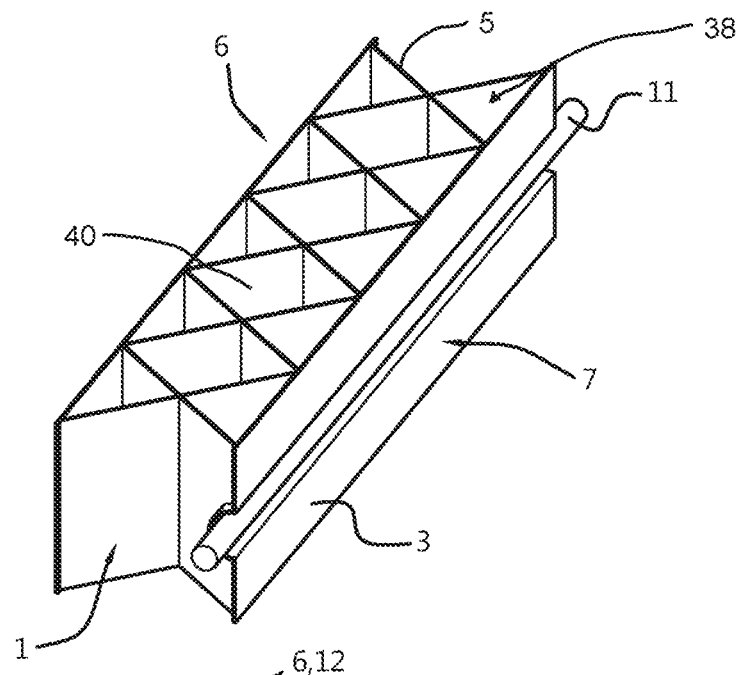
FIG. 8 shows a schematic perspective view of an exemplary embodiment of a reinforcement part according to the present subject matter, with side apertures.
Figure 9:
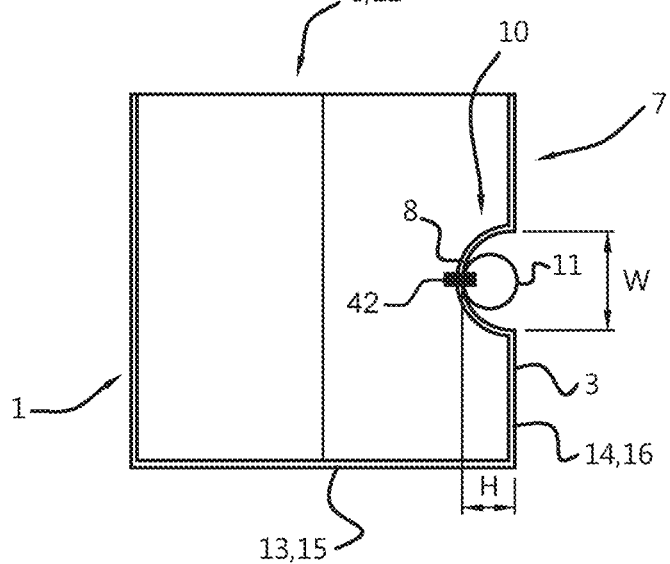
FIG. 9 shows a cross-sectional view of the reinforcement part according to FIG. 8.

Advantageously, the apertures 8 have a partly circular, oval or elliptical shape, as more clearly shown in FIGS. 7 and 9 to prevent the occurrence of stress concentrations and damage to the cabling 11 due to irregular or rough edges. The width W of the apertures 8 may amount to 10-30 mm, optionally 15-25 mm, or 20 mm. The height H of the apertures may for instance amount to 10-20 mm, or 15 mm. The walls 4 of the ribbing structure 5 may have a thickness of 1-3 mm, or 2 mm. The structural wall 3 may have a thickness of 2-4 mm, or 3 mm. This, however, depends on the specific design of the reinforcement part 1. The apertures can provide a locus for mounting a fastener.

Figure 10:
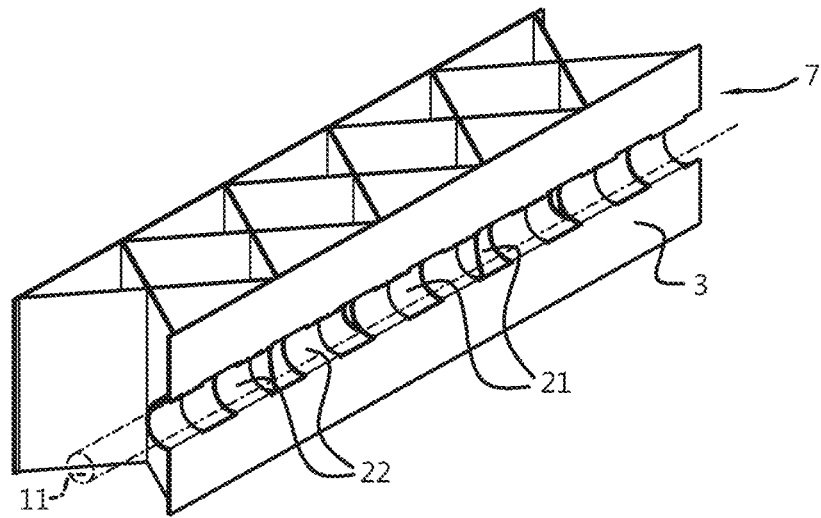
FIG. 10 shows a schematic perspective view of an exemplary embodiment of a reinforcement part according to the present subject matter, with partial side apertures.

As shown in FIG. 10 partial apertures have been made in the structural wall 3. Optionally, as illustrated in FIG. 10, such partial apertures comprise (when seen in the longitudinal direction X) aperture portions 21 alternating with solid portions 22. Optionally, the solid portions 22 coincide with the areas where the ribbing structure 5 contacts the structural wall 3 at side regions 7 of the reinforcement part 1. Optionally, the surface area of the aperture portions 21 is 40-60%, such as 50%, of the surface area of the structural wall 3. An aperture can be sized to receive a fastener 42.

Figure 11:
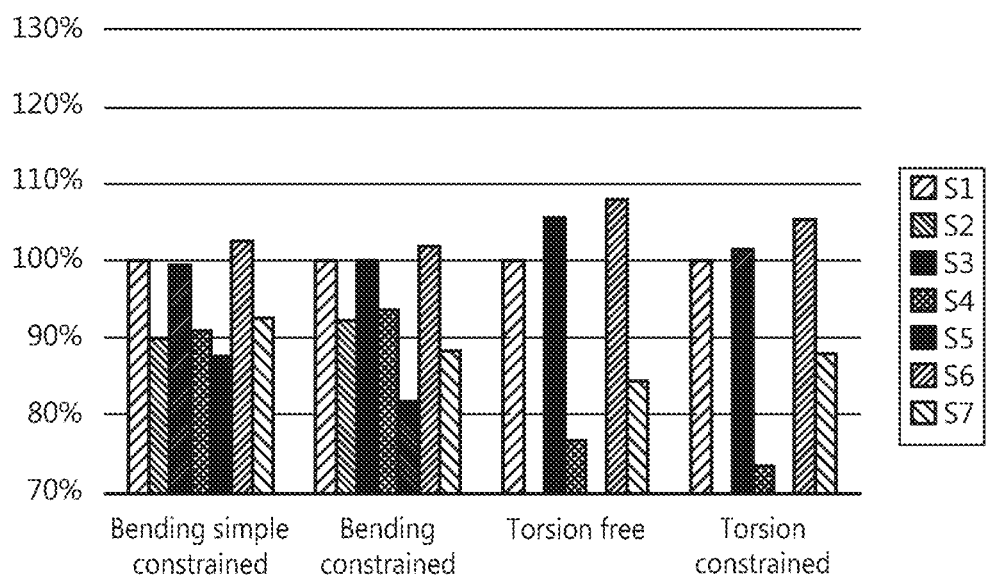
FIG. 11 shows a first comparative example of relative stiffnesses for several aperture configurations of a beam-shaped reinforcement part, for several loading conditions.
Figure 12:
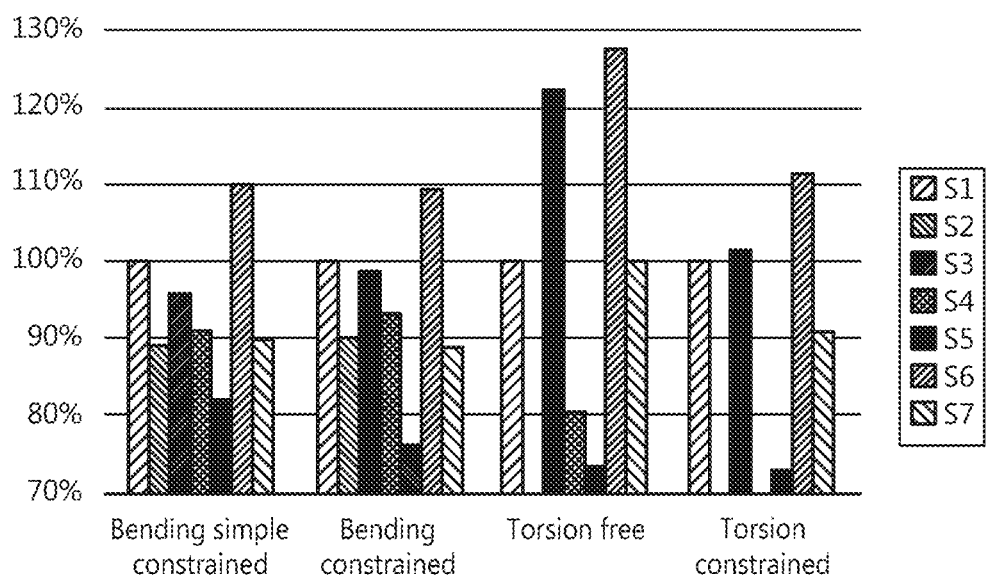
FIG. 12 shows a second comparative example of relative stiffnesses for several aperture configurations of a beam-shaped reinforcement part, for several loading conditions.

Comparative Examples:

FIGS. 11 and 12 show comparisons (simulations) of relative stiffnesses for several aperture configurations of an example beam-shaped reinforcement part 1, for several loading conditions.

In the first comparative example of FIG. 11, the beam has a height of 70 mm and a width of 60 mm.

In the second comparative example of FIG. 12, the beam has a height of 40 mm and a width of 60 mm.

The material used for both beams is SABIC® STAMAX™ 40YM240 with a density of 1.22 gram/cm3, a Young's modulus of 3092 MPa and a Poisson ratio of 0.34. These properties were taken from measurements at 85° C. under quasi-static tensile rate. The software used is Abaqus Standard V2016. The simulated material is linear elastic (with the above-mentioned parameters).

From left to right, respectively, the following loading conditions are shown:
"Bending simple constrained";
"Bending constrained";
"Torsion free"; and
"Torsion constrained".

In the "bending simple constrained" loading condition, the beam is simply supported (from below) at opposite end ribs of the beam (DOF 2, 3) and at a center rib, halfway the length of the beam (DOF 1). A downward force of 1000 N is applied at the center rib.

For sake of completeness, "DOF" stands for "degree of freedom", as commonly used to describe the state of a physical or mechanical system, with DOF 1, 2 and 3 respectively standing for translations along the X-, Y- and Z-axes and DOF 4, 5, and 6, respectively standing for rotations around the X-, Y- and Z-axes.

In the "bending constrained" loading condition, the beam is fully fixed at opposite end ribs (DOF 1-6) of the beam, but not at the center rib. Again, a downward force of 1000 N is applied at the center rib.

In the "torsion free" loading condition, the beam is fixed (DOF 1-6) at one end of the beam. A torque of 10 Nm is applied at the opposite end of the beam (around the longitudinal axis X).

In the "torsion constrained" loading condition, the beam is again fixed (DOF 1-6) at one end of the beam. Again, a torque of 10 Nm is applied at the opposite end of the beam (around the longitudinal axis X). The opposite end of the beam is now fixed though (DOF 2, 3, 5, 6).

It should furthermore be noted that for bending loads the displacements of a reference node at the bottom of the reinforcement part, where the load is applied, is shown. For torsional loads the angular rotation of the reference node to which the moment is applied is shown.

In FIGS. 11 and 12:

S1 indicates a relative stiffness simulation with top aperture (e.g. the prior art beam);

S2 indicates a relative simulation with bottom aperture and structural wall aperture, e.g. the aperture of the ribbing structure is left uncovered by the structural wall;

S3 indicates a relative stiffness simulation with bottom aperture and intact structural wall (e.g. according to the present subject matter);

S4 indicates a relative stiffness simulation with bottom aperture and partially intact structural wall (e.g. according to the present subject matter), wherein 50% of the structural wall surface area is aperture;

S5 indicates a relative stiffness simulation with side aperture and structural wall aperture; and S6 indicates a relative stiffness simulation with side aperture and intact structural wall (e.g. according to the present subject matter).

S7 indicates a relative stiffness simulation with side aperture and partially intact structural wall (e.g. according to the present subject matter), wherein 50% of the structural wall surface area is aperture.

The relative stiffness of the prior art reinforcement part 1 with top apertures is set at 100%, as indicated by S1.

As can be clearly seen, for virtually all loading conditions the relative stiffnesses S3 and S6 for the beam according to the present subject matter are visibly higher than the relative stiffness of the prior art beam indicated by S1—with the configuration with side apertures (indicated by S6) showing the best performance for all loading conditions.

Furthermore, it can be seen that the structural wall 3 can optionally be kept fully intact at the second side region 7 (e.g. free from apertures or similar features), otherwise performance may be worse than with the prior art beam (as indicated by relative stiffnesses S2 and S5). Only with certain loading conditions a partial aperture is preferred, or at least a partial aperture with 50% of the structural wall surface area removed (such as with the "torsion free" loading condition as shown in FIG. 12). Optionally, less than 50% of the structural wall surface area is aperture, such as 5-50%, 5-40%, 5-30%, 5-20% or 5-10% of the structural wall surface area. However, according to the simulations discussed above, the inventors submit the loss of stiffness due to having partial apertures does not linearly scale with the removed surface area.

The invention claimed is:

1. A Reinforcement part for reinforcing a vehicle component, comprising a structural wall extending along a longitudinal axis (X) of the reinforcement part, wherein the structural wall at least partly encloses walls of a ribbing structure for supporting structural strength of the reinforcement part, the reinforcement part, when viewed in cross-section, having a first side region configured for allowing a first load portion to pass through and a second side region configured for allowing a second load portion to pass through, wherein the first load portion represents the largest load portion occurring at the cross-section, wherein the ribbing structure is at least provided at the first side region and the second side region, characterized in that at the second side region, when viewed along the longitudinal axis, the walls of the ribbing structure are provided with cut-outs, the structural wall at the second side region being shaped to at least partially cover the contours of the cut-outs, in such a way, that a continuously shaped cut-out is formed in the structural wall for routing cabling, whereas the walls of the ribbing structure at the first side region are free from cut-outs to keep the ribbing structure at the first side region intact.

2. The Reinforcement part according to claim 1, wherein the second load portion represents the smallest load portion occurring at the cross-section.

3. The Reinforcement part according to claim 1, wherein, when viewed in cross-section, the structural wall has an open side, the first side region comprising the open side, the walls of the ribbing structure at the open side being free from cut-outs.

4. The Reinforcement part according to claim 3, the structural wall comprising a base wall and side walls connected to the base wall, the base wall and side walls enclosing the ribbing structure, wherein the second side region is located at the base wall and/or at least one of the side walls.

5. The Reinforcement part according to claim 4, wherein the structural wall has a U-shape, comprising a base and legs connected to the base, the legs forming the side walls of the structural wall and the base forming the base wall of the structural wall.

6. The Reinforcement part according to claim 1, wherein the walls of the ribbing structure at the first side region have a larger thickness than the walls of the ribbing structure at the second side region.

7. The Reinforcement part according to claim 1, wherein the ribbing structure comprises a cross-ribbing structure, wherein the walls of the cross-ribbing structure are arranged at an angle with respect to each other.

8. The Reinforcement part according to claim 1, wherein the cut-outs have a partly circular, oval or elliptical shape.

9. The Reinforcement part according to claim 1, wherein a width (W) of the cut-outs, when viewed along the longitudinal axis (X), is 10-30 mm and/or wherein a height (H) of the cut-outs is 10-20 mm.

10. The Reinforcement part according to claim 1, wherein the structural wall has a thickness of 1-6 mm.

11. The Reinforcement part according to claim 1, comprising cabling arranged in the continuously shaped cut-out.

12. A vehicle component comprising a reinforcement part according to claim 1.

13. The vehicle component according to claim 12, wherein the vehicle component is a tailgate, a front end module or a door module.

14. A vehicle comprising the vehicle component according to claim 12.

15. A reinforcement part for reinforcing a vehicle component, comprising a structural wall extending along a longitudinal axis (X) of the reinforcement part, wherein the structural wall at least partly encloses walls of a ribbing structure for supporting structural strength of the reinforcement part, the reinforcement part, when viewed in cross-section, having a first side region configured for allowing a first load portion to pass through and a second side region configured for allowing a second load portion to pass through, wherein the first load portion represents the largest load portion occurring at the cross-section, wherein the ribbing structure is at least provided at the first side region and the second side region, characterized in that at the second side region, when viewed along the longitudinal axis, the walls of the ribbing structure are provided with cut-outs, the structural wall at the second side region being shaped to at least partially cover the contours of the cut-outs, in such a way, that a continuously shaped cut-out is formed in the structural wall for routing cabling, whereas the walls of the ribbing structure at the first side region are free from cut-outs to keep the ribbing structure at the first side region intact, wherein the second load portion represents the smallest load portion occurring at the cross-section, and wherein, when viewed in cross-section, the structural wall has an open side, the first side region comprising the open side, the walls of the ribbing structure at the open side being free from cut-outs.

16. The reinforcement part according to claim 15, the structural wall comprising a base wall and side walls connected to the base wall, the base wall and side walls enclosing the ribbing structure, wherein the second side region is located at the base wall and/or at least one of the side walls.

17. The Reinforcement part according to claim 16, wherein the structural wall has a U-shape, comprising a base and legs connected to the base, the legs forming the side walls of the structural wall and the base forming the base wall of the structural wall.

18. A Reinforcement part for reinforcing a vehicle component, comprising a structural wall extending along a longitudinal axis (X) of the reinforcement part, wherein the structural wall at least partly encloses walls of a ribbing structure for supporting structural strength of the reinforcement part, the reinforcement part, when viewed in cross-section, having a first side region configured for allowing a first load portion to pass through and a second side region configured for allowing a second load portion to pass through, wherein the first load portion represents the largest load portion occurring at the cross-section, wherein the ribbing structure is at least provided at the first side region and the second side region, characterized in that at the second side region, when viewed along the longitudinal axis, the walls of the ribbing structure are provided with cut-outs, the structural wall at the second side region being shaped to at least partially cover the contours of the cut-outs, in such a way, that a continuously shaped cut-out is formed in the structural wall for routing cabling, whereas the walls of the ribbing structure at the first side region are free from cut-outs to keep the ribbing structure at the first side region intact, wherein a width (W) of the cut-outs, when viewed along the longitudinal axis (X), is 10-30 mm and/or wherein a height (H) of the cut-outs is 10-20 mm, and wherein the structural wall has a thickness of 1-6 mm.

19. The Reinforcement part according to claim 18, wherein the walls of the ribbing structure at the first side region have a larger thickness than the walls of the ribbing structure at the second side region.

20. The Reinforcement part according to claim 19, wherein the ribbing structure comprises a cross-ribbing structure, wherein the walls of the cross-ribbing structure are arranged at an angle with respect to each other.

* * * * *